US009286727B2

(12) United States Patent
Kim et al.

(10) Patent No.: US 9,286,727 B2
(45) Date of Patent: Mar. 15, 2016

(54) SYSTEM AND METHOD FOR PRESENTING TRUE PRODUCT DIMENSIONS WITHIN AN AUGMENTED REAL-WORLD SETTING

(71) Applicant: QUALCOMM Incorporated, San Diego, CA (US)

(72) Inventors: Eunjoo Kim, San Diego, CA (US); Per Orum Nielsen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 196 days.

(21) Appl. No.: 14/222,494

(22) Filed: Mar. 21, 2014

(65) Prior Publication Data

US 2014/0285522 A1 Sep. 25, 2014

Related U.S. Application Data

(60) Provisional application No. 61/805,103, filed on Mar. 25, 2013.

(51) Int. Cl.
*G09G 5/00* (2006.01)
*G06T 19/00* (2011.01)
*G09G 5/377* (2006.01)
*G06Q 30/06* (2012.01)

(52) U.S. Cl.
CPC .......... *G06T 19/006* (2013.01); *G06Q 30/0601* (2013.01); *G06Q 30/0643* (2013.01); *G09G 5/377* (2013.01); *G06T 2210/21* (2013.01)

(58) Field of Classification Search
None
See application file for complete search history.

(56) References Cited

U.S. PATENT DOCUMENTS 7,249,005 B2 *  7/2007  Loberg ............... G06T 15/50
                                            345/426
7,457,730 B2 * 11/2008  Degnan .............. G06T 11/60
                                             52/235
2002/0093538 A1 *  7/2002  Carlin ............... G06Q 30/02
                                            715/778
2002/0094189 A1    7/2002  Navab et al.
2002/0107762 A1    8/2002  Kunigita
2007/0124215 A1    5/2007  Simmons, Jr.
2010/0185529 A1 *  7/2010  Chesnut ............. G06Q 30/00
                                            705/26.1
2010/0289817 A1 * 11/2010  Meier ............... G06T 15/20
                                            345/619

(Continued)

OTHER PUBLICATIONS

International Search Report and Written Opinion—PCT/US2014/031616—ISA/EPO—Jan. 29, 2015.

*Primary Examiner* — David H Chu
(74) *Attorney, Agent, or Firm* — Kilpatrick Townsend Stockton LLP

(57) ABSTRACT

Methods, systems, computer-readable media, and apparatuses for presenting a representation of an augmented real-world setting are presented. In some embodiments, a method includes presenting a representation of an augmented real-world setting. The method includes capturing a plurality of images of a real-world setting. The method also includes analyzing one or more real-world objects within the plurality of images of the real-world setting. The method further includes receiving information pertaining to a real-world product, wherein the information is indicative of first physical dimensions of the real-world product during a first mode of operation and second physical dimensions of the real-world product during a second mode of operation and overlaying an augmented reality object depicting the real-world product during the first mode of operation, and having the first physical dimensions, within at least one of the plurality of images of the real-world setting, based at least in part on the analyzing step.

30 Claims, 8 Drawing Sheets

(56) References Cited

U.S. PATENT DOCUMENTS

| | | | |
|---|---|---|---|
| 2011/0221769 A1 | 9/2011 | Leung et al. | |
| 2012/0105473 A1* | 5/2012 | Bar-Zeev | G02B 27/017 345/633 |
| 2012/0120113 A1* | 5/2012 | Hueso | G06T 19/006 345/672 |
| 2012/0231424 A1* | 9/2012 | Calman | G09B 25/04 434/72 |
| 2013/0135295 A1* | 5/2013 | Li | G06T 19/006 345/419 |
| 2015/0070347 A1* | 3/2015 | Hofmann | G06K 9/00208 345/419 |

* cited by examiner

SYSTEM AND METHOD FOR PRESENTING TRUE PRODUCT DIMENSIONS WITHIN AN AUGMENTED REAL-WORLD SETTING

CROSS-REFERENCE TO RELATED APPLICATIONS

This application claims the benefit of U.S. Provisional Application No. 61/805,103, filed Mar. 25, 2013, entitled "METHOD FOR PRESENTING PRODUCT DIMENSIONS IN A VIRTUAL SPACE" which is incorporated herein by reference.

BACKGROUND

Aspects of the disclosure relate to computer vision and augmented reality.

Online shopping has become an extremely popular way for a consumer to purchase goods. Unsurprisingly, online shopping has become a multi-billion dollar industry. While viewing a product during an online shopping experience, a user may be able to visualize the product in his/her physical environment using augmented reality techniques. The user may visualize how a product, being scaled to its proper physical dimensions, may fit in the user's physical environment.

Envisioning products in different settings is a difficult task, frequently encountered in various circumstances. For example, a consumer may wish to envision how a coffee maker would look on the consumer's countertop in his/her kitchen, and whether the coffee maker would fit on the countertop underneath the cabinets. Assuming the coffee maker fits under the countertop, the consumer may also wish to know whether the coffee maker would still fit under the countertop with the coffee maker's lid in an open position.

Existing solutions only take into account the product's dimensions based on published specifications (e.g., width× height×depth). Often times a product requires more space than what is defined by the published physical dimensions, as described in the coffee maker example above. For example, when a coffee maker has the upper lid in an open position, the height of the coffee maker is increased and the coffee maker takes up more space in the physical environment. As a result, the user may be misguided as to the actual dimensions of the product and how well it may fit within his/her physical environment. Furthermore, these solutions do not take into account behavior of the products within certain physical environments.

BRIEF SUMMARY

Certain embodiments are described for presenting a representation of an augmented real-world setting using a mobile device. The augmented real-world setting may show the product or other object having various dimensions within a real-world setting.

In some embodiments, a method includes presenting a representation of an augmented real-world setting using a mobile device. The method includes capturing a plurality of images of a real-world setting. The method also includes analyzing, via the mobile device, one or more real-world objects within the plurality of images of the real-world setting. The method further includes receiving information pertaining to a real-world product, wherein the information is indicative of first physical dimensions of the real-world product during a first mode of operation and second physical dimensions of the real-world product during a second mode of operation. The method additionally includes overlaying an augmented reality (AR) object depicting the real-world product during the first mode of operation, and having the first physical dimensions, within at least one of the plurality of images of the real-world setting, based at least in part on the analyzing step. The method further includes displaying the augmented real-world setting. The method also includes displaying additional information pertaining to the real-world product during the second mode of operation, and having the second physical dimensions, within at least one of the plurality of images of the real-world setting.

In some embodiments, displaying the additional information further comprises updating augmented real-world setting to depict the AR object having the second physical dimensions.

In some embodiments, the additional information comprises a notification that the second physical dimensions conflict with the one or more real-world objects within the augmented real-world setting.

In some embodiments, the method also includes updating, via the mobile device, the augmented real-world setting based at least in part on a perspective of the real-world setting from the mobile device.

In some embodiments, the analyzing step comprises determining physical dimensions of the one or more real-world objects within at least one image of the real-world setting.

In some embodiments, the method also includes determining whether the overlaid AR object depicting the real-world product conflicts with the one or more real-world objects within the augmented real-world setting, based at least in part on at least one of the first physical dimensions of the product model or the second physical dimensions of the real-world product.

In some embodiments, the method also includes recommending, via the mobile device, a second position for overlaying the AR object depicting the real-world product within at least one of the plurality of images of the real-world setting, in response to determining the conflict.

In some embodiments, the method also includes recommending, via the mobile device, one or more alternate real-world products, in response to determining the conflict.

In some embodiments, the method also includes updating the augmented real-world setting by replacing the AR object with a second AR object depicting at least one of the one or more alternate real-world products within at least one of the plurality of images of the real-world setting.

In some embodiments, the method also includes receiving the information pertaining to the real-world product from a server computer.

In some embodiments, the first physical dimensions and the second physical dimensions comprise at least one of a height, length, and width.

In some embodiments, an apparatus for presenting a representation of an augmented real-world setting includes an image capture device configured to capture a plurality of images of a real-world setting, a display device configured to display the augmented real-world setting, and a processor coupled to the image capture device and the display device. The processor is configured to analyze one or more real-world objects within the plurality of images of the real-world setting, receive information pertaining to a real-world product, wherein the information is indicative of first physical dimensions of the real-world product during a first mode of operation and second physical dimensions of the real-world product during a second mode of operation, overlay an AR object depicting the real-world product during the first mode of operation, and having the first physical dimensions, within at least one of the plurality of images of the real-world setting based at least in part on the analyzing step, and display, via the display device, additional information pertaining to the real-world product during the second mode of operation, and having the second physical dimensions, within at least one of the plurality of images of the real-world setting.

In some embodiments, an apparatus for presenting a representation of an augmented real-world setting includes means for capturing a plurality of images of a real-world setting, means for analyzing one or more real-world objects within the plurality of images of the real-world setting, means for receiving information pertaining to a real-world product, wherein the information is indicative of first physical dimensions of the real-world product during a first mode of operation and second physical dimensions of the real-world product during a second mode of operation, means for overlaying an augmented reality (AR) object depicting the real-world product during the first mode of operation, and having the first physical dimensions, within at least one of the plurality of images of the real-world setting, based at least in part on the analyzing step, means for displaying the augmented real-world setting, and means for displaying additional information pertaining to the real-world product during the second mode of operation, and having the second physical dimensions, within at least one of the plurality of images of the real-world setting.

In some embodiments, a processor-readable, non-transitory, computer readable medium includes processor readable instructions configured to cause a processor, on a mobile device, to capture a plurality of images of a real-world setting, analyze one or more real-world objects within the plurality of images of the real-world setting, receive information pertaining to a real-world product, wherein the information is indicative of first physical dimensions of the real-world product during a first mode of operation and second physical dimensions of the real-world product during a second mode of operation, overlay an augmented reality (AR) object depicting the real-world product during the first mode of operation, and having the first physical dimensions, within at least one of the plurality of images of the real-world setting, based at least in part on the analyzing step, display the augmented real-world setting, and display additional information pertaining to the real-world product during the second mode of operation, and having the second physical dimensions, within at least one of the plurality of images of the real-world setting.

BRIEF DESCRIPTION OF THE DRAWINGS

Aspects of the disclosure are illustrated by way of example. In the accompanying figures, like reference numbers indicate similar elements.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

An augmented reality implementation allows the user to visualize a product in his/her physical environment (the "real world"). The product may be replicated within the physical environment based on the environment's physical dimensions and appearance. The user may position the product within the physical environment to determine how well the product fits or satisfaction with other preferences such as size and/or color.

A user may place the product wherever he/she wishes within a camera view of the physical environment. The product may be scaled proportionally against the physical environment to provide a realistic view. The user may be informed of additional physical dimensions that the product may use within the physical environment. For example, the user may be informed of any extendable part of the product that would increase the product dimensions. The user may adjust the product's position within the physical environment accordingly, or select a different product if the user finds that the product may no longer fit in the intended position as originally thought.

A manufacturer or vendor of the product may define not only the physical product dimensions, but also the virtual dimensions a product may require when in use. The manufacturer or vendor may also define additional information showing further product details associated with its use (e.g., an opening door, spinning fan, etc.)

Figure 1:
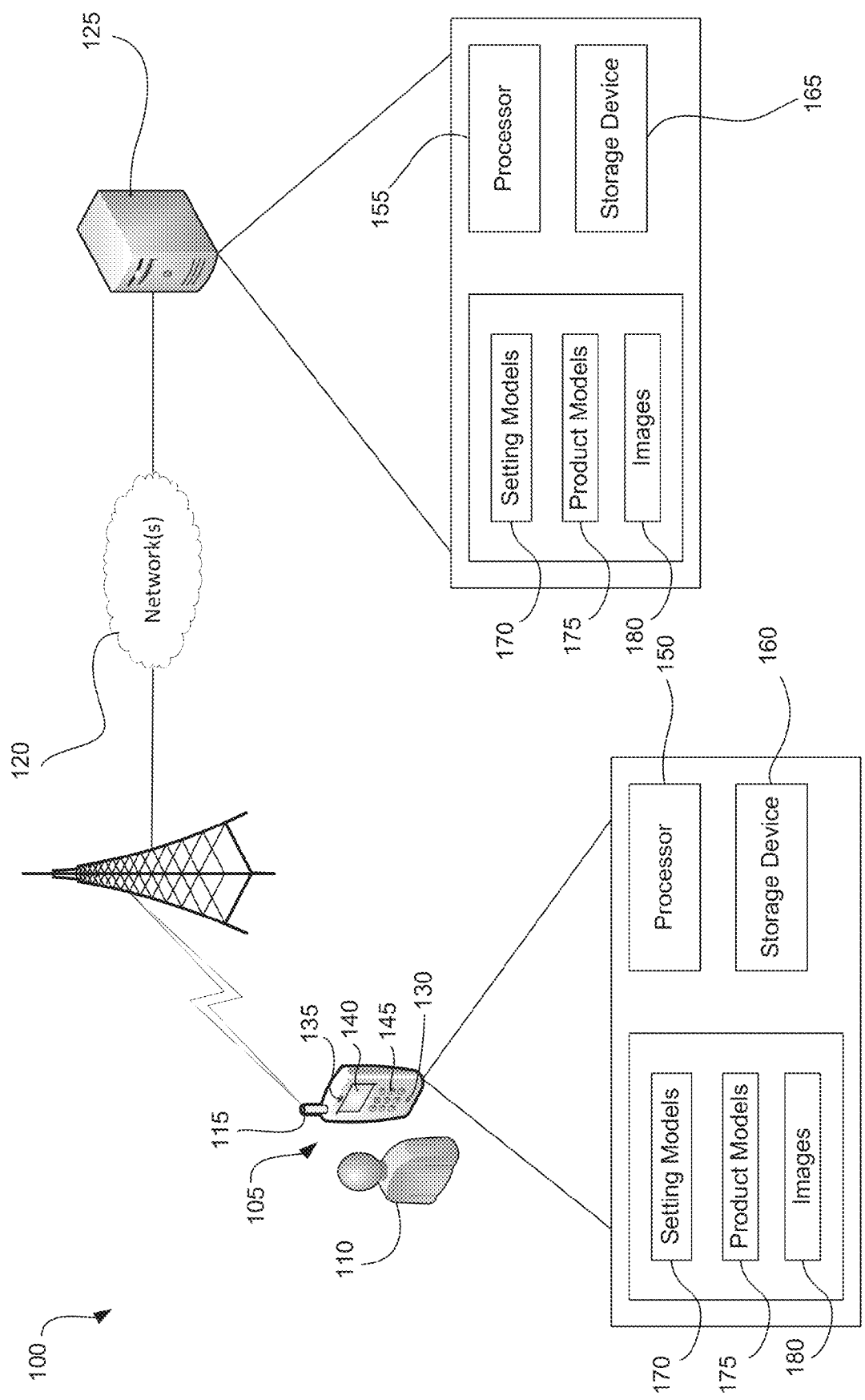
FIG. 1 illustrates a system for generating, modifying and/or displaying three-dimensional models according to one embodiment.

FIG. 1 illustrates a system 100 for generating, modifying and/or displaying three-dimensional models according to one embodiment. The system 100 may include a device, which may be an electronic device and/or mobile device (e.g., a cellular phone, smart phone, personal digital assistant, tablet computer, laptop computer, digital camera, handheld gaming device, etc.). As shown, system 100 includes a mobile device 105 that may be used by a user 110. Mobile device 105 may include a transceiver 115, which may allow the device to send and/or receive data and/or voice communications. Mobile device 105 may be connected (e.g., via transceiver 115) to a network 120 (e.g., a wireless network and/or the Internet). Through the wireless network, mobile device 105 may be able to communicate with an external server computer 125.

Mobile device 105 may include a microphone 130. Microphone 130 may permit mobile device 105 to collect or capture audio data from the device's surrounding physical environment. Mobile device 105 may include a speaker 135 to emit audio data (e.g., received from a user on another device during a call, or generated by the device to instruct or inform the user 110). Mobile device 105 may include a display 140. Display 140 may present the user 110 with representations of original or modified models, dynamic images of a surrounding environment (e.g., prior to a user's capture of an image using the device), etc. Display 140 may present interaction options to user 110 (e.g., to allow user 110 to create a new model, modify a model, save a modified model, rotate a view of a model, etc.) Mobile device 105 may include user-input components 145. User-input components 145 may include, e.g., buttons, a keyboard, a number pad, a touch screen, a mouse, etc. User-input components 145 may allow, e.g., user 110 to modify a setting model and/or interact with three-dimensional models being created or modified. User-input components 145 may also allow the user 110 to select a product to be displayed within a setting model. Though not shown, mobile device 105 may also include an imaging component (e.g., a camera). The imaging component may include, e.g., a lens, light source, etc. The imaging component (or camera) may also include a RGB camera, a depth camera, stereo camera, etc. The term "camera" may also refer to multiple cameras that may be of different types (e.g., an RGB camera and a depth camera). In the case that the camera is a depth camera, it may provide depth data of the imaged environment. Alternatively, in the case that the camera is a stereo camera, it may use at least one image (frame of video) from the camera to produce depth data for the imaged environment.

Mobile device 105 may include a processor 150, and/or mobile device 105 may be coupled to an external server 125 with a processor 155. Processor(s) 150 and/or 155 may perform part or all of any above-described processes. In some instances, model generation and model modification are performed locally on the device. In some instances, external server computer's processor 155 is not involved in creating, modifying or displaying models. In some instances, models are created using external server computer's processor 155 and modified using remote processor 150.

Mobile device 105 may include a storage device 160, and/or mobile device 105 may be coupled to an external server 125 with a storage device 165. Storage device(s) 160 and/or 165 may store models, such as setting models and/or product models. Setting models (which may include original and/or modified setting models) may be stored in a setting model database 170 that is independent from a product model database 175 that stores product models. Alternatively, all models are stored in a single database. In one instance, all models may be decomposed into product models. A setting model database may store parameters connecting products to settings (e.g., identifying product(s) in a setting, setting dimensions, inter-object distances, etc.). Storage device(s) 160 and/or 165 may include an image database 180 to store images, such as all images used to generate models, all images taken by mobile device 105, all images saved by user 110, etc.

Figure 2:
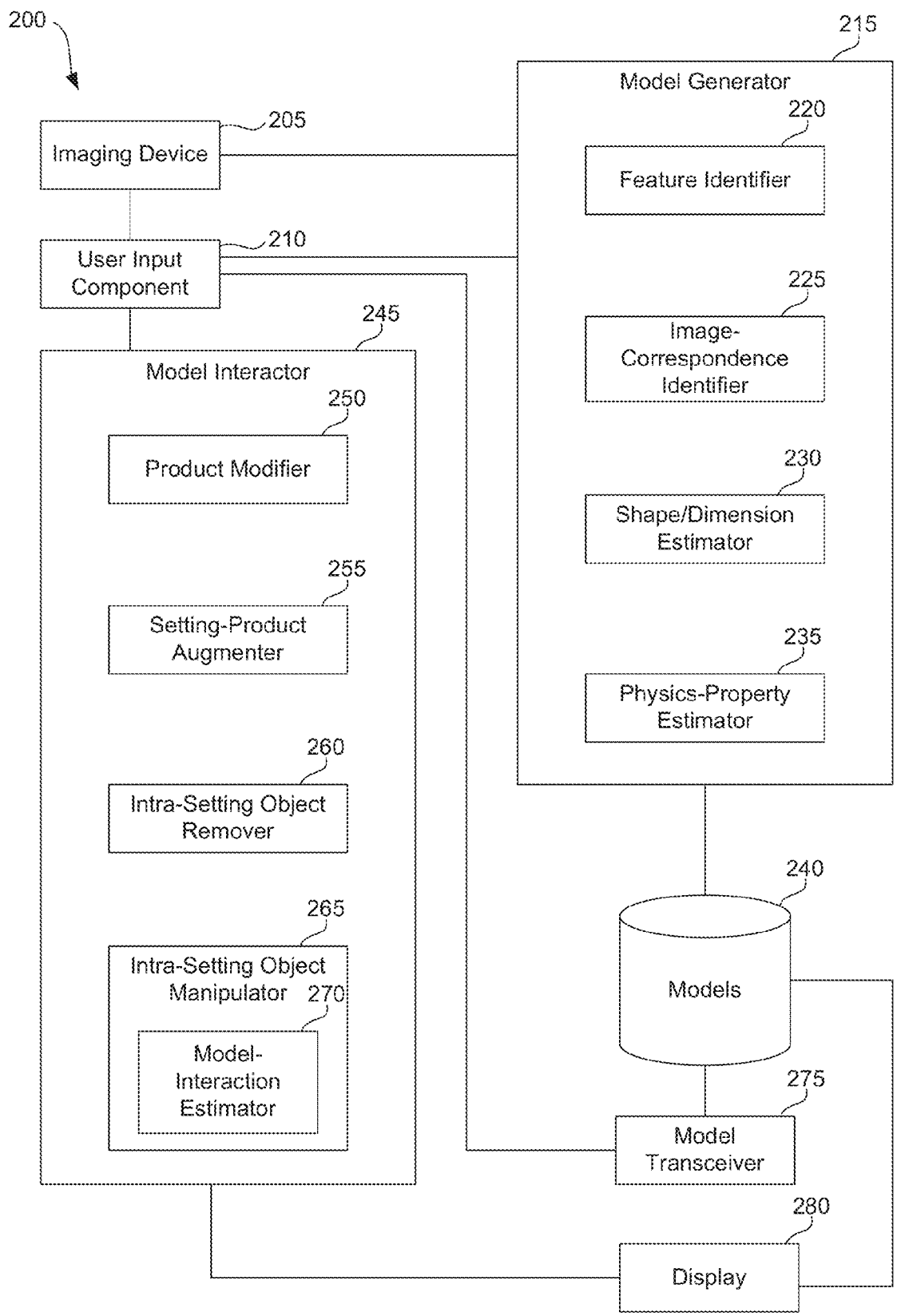
FIG. 2 shows a system for generating, modifying and/or displaying three-dimensional models according to one embodiment.

FIG. 2 shows a system 200 for generating, modifying and/or displaying three-dimensional models according to one embodiment. Part or all of system 200 may be, e.g., incorporated into one or more mobile devices and/or electronic devices (e.g., mobile phones). For example, part or all of system 200 may be incorporated into the mobile device 105 of FIG. 1. In another example, part or all of system 200 may be incorporated into a remote server and/or cloud server.

System 200 includes an imaging device 205, which may be configured to capture images and/or videos. Imaging device 205 may include a camera, such as a cell-phone camera, RGB camera, a depth camera, stereo camera, etc. Imaging device 205 may be configured to capture images and/or videos upon receiving a command from a user via a user input component 210. For example, a user may click an image-collection button or a capture-video button.

Images captured by imaging device 205 may be processed by model generator 215. Model generator 215 may process the images automatically or upon receiving a command from a user via the user input component 210. Model generator 215 may be configured to create an augmented real-world setting of the real-world setting based on one or more images. The augmented real-world setting may include one or more product models. Model-generation techniques described herein may be implemented by model generator 215.

Model generator 215 may include a feature identifier 220 to identify and locate features within the images. For example, feature identifier 220 may include an edge detector, a corner detector, a high-contrast detector, etc.

Model generator 215 may include an image-correspondence identifier 225 configured to match the features across images. For each matched feature, image-correspondence identifier 225 may associate image-based locations of the features in each of the images with each other. In some instances, image-correspondence identifier 225 identifies a transformation between the images and/or between the images and real life based on the matched features.

Model generator 215 may include a shape/dimension estimator 930. Shape/dimension estimator 230 may estimate a shape and/or one or more dimensions characterizing an object, an object within a setting, or a setting. The estimated shape and/or dimension may be based on imaging-device parameters, image-based dimensions of features, image based distances between features, etc.

Model generator 215 may include a physics-property estimator 235, which may estimate physics-related properties of an object, an object within a setting, or a scene. For example, physics-property estimator 235 may estimate a mass, density, rigidity, strength, etc. of an object. The estimation may be based on visual properties apparent through the images (e.g., a texture on a surface of an object) or based on user input received via user input component 210. In some instances physics-property estimator 235 accesses a database that includes object and material properties. Physics-property estimator 235 estimates an identity of object being imaged (e.g., "Marble Countertop"), looks up the material of the object, and estimates the mass of the object based on the material's density. Databases may include this type of information for commonly available items (e.g., furniture items) and/or for items stored in select stores.

Models generated by model generator 215 may be stored in a model database 240. The model database 240 may include, in some instances, models of objects and settings. In some instances, separate databases store models and settings. In some instances, one database stores models of objects, and another stores indications as to how the objects are combined to form a setting. In some instances, only object models or only setting models are stored.

A user may then interact with the models stored in model database 240 via model interactor 245. Thus, a user may enter inputs through a user input component 210 and thereby interact with one or more models.

Model interactor 245 may include a product modifier 250. Product modifier 250 may allow a user to modify, e.g., a color, dimension, shape, etc. of a product depicted within the augmented real-world setting. For example, a user could modify a coffee maker model from a white color to a brown color. In another example, a user could modify the usage attributes of the product. The user could modify the coffee maker such that the coffee maker is depicted with the lid open, as if the coffee maker was being used to make coffee. In some embodiments, the dimensions of the product may alter based on the modification to the product made by the user. Thus, through product modifier 250, a user may be able to modify model properties related to physical properties of a product or setting.

Model interactor 245 may include a setting-product augmenter 255. Setting-product augmenter 255 may be configured to augment a real-world setting model with a product model. A user may select the setting model to be augmented and the product model which will augment the setting model. The augmented real-world setting model may include realistic proportions between the setting and product due to estimated dimensions associated with both models. In some embodiments, the dimensions of the product may be accessed via a database of a server computer.

Model interactor 245 may include an intra-setting object remover 260. A setting model may include a plurality of objects in the model. A user may select one object (e.g., via user input component 210) and request that it be removed. Intra-setting object remover 260 may then remove the object from the setting.

Model interactor 245 may include an intra-setting product manipulator 265. Through intra-setting product manipulator 265 (and, e.g., user input component 210), a user may be able to move, drop, slide, rotate, etc. a product within the augmented real-world setting. In some embodiments, the intra-setting product manipulator 265 may also be configured to manipulate any originally and still existing objects within the augmented real-world setting. A product-interaction estimator 270 may estimate an effect of such manipulations. For example, if a user attempts to modify a product, via product modifier 250 described above, the product-interaction estimator 270 may determine whether the modification would create any conflicts within the augmented real-world setting. For example, using the coffee maker with lid open example above, if the user modifies the coffee maker such that it is depicted within the augmented real-world setting with the lid open, the product-interaction estimator 270 may determine if the coffee maker lid comes into contact with an object (e.g., cabinets) within the augmented real-world setting.

Models (e.g., as generated or after a user interacted with the model to modify the model, augment a model, remove an object from a model, or manipulate a product within a setting) may be received and/or transmitted by model transceiver 275. For example, models may be shared across a model-sharing or social-networking website.

System 200 may further include a display 280. Display 280 may display images captured by imaging device 205, representations of models generated by model generator 215, representations of post-interaction or modified models as modified by model interactor 245, etc. Display 280 may further present instructions to a user.

Figure 3:
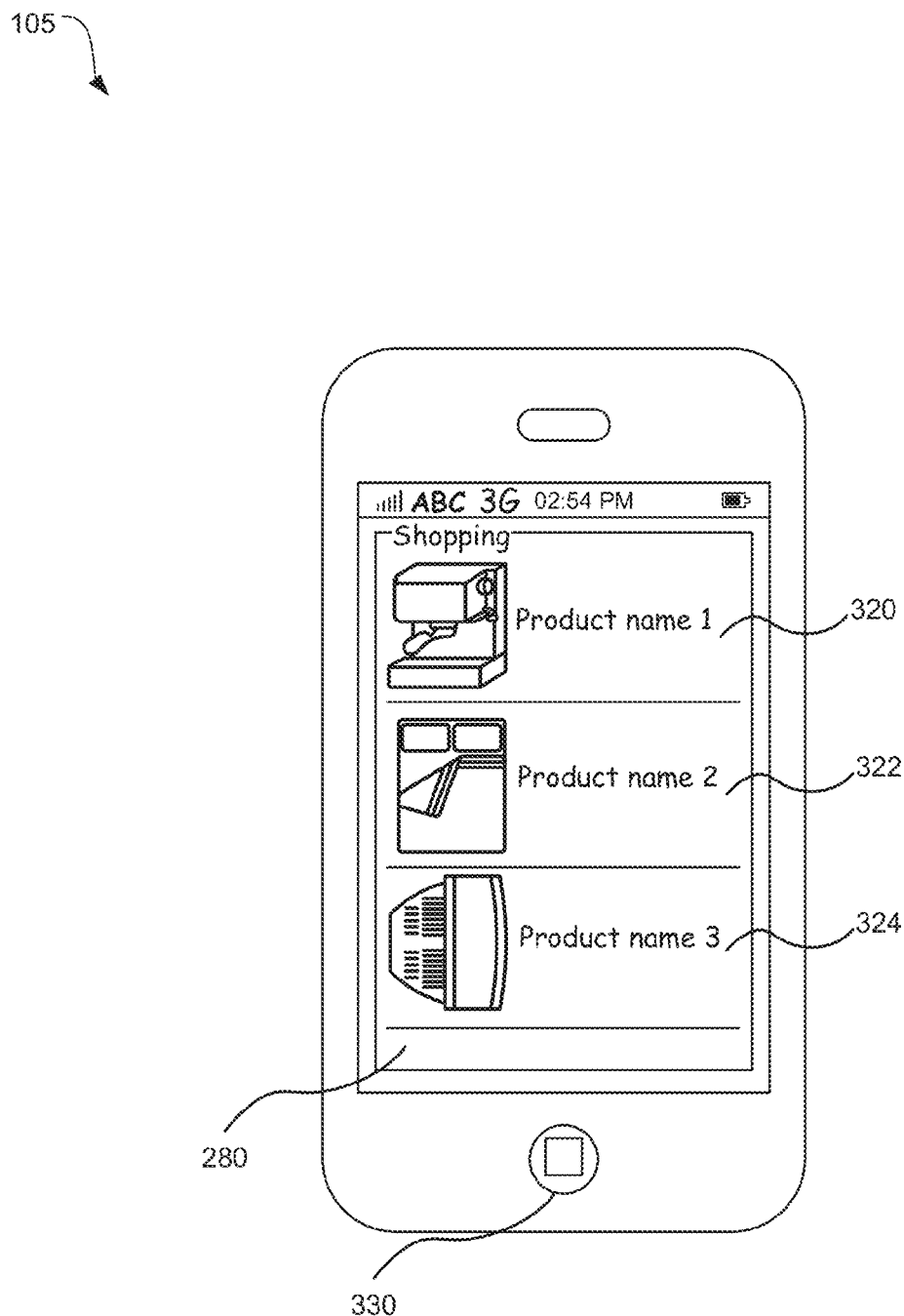
FIG. 3 illustrates an example of a computing system in which one or more embodiments may be implemented.

FIG. 3 illustrates a simplified diagram of a mobile device 105 that may incorporate one or more embodiments. Mobile device 105 may include a display 280 configured to output a graphical interface to a user. The mobile device 105 may also include an input 330 operable for interaction with the mobile device 105 by the user. The input 330 may be communicatively coupled to the user input component 210 (FIG. 2) of the mobile device 105. Additionally, mobile device 105 may include one or more imaging devices 205 (FIG. 2), such as a camera(s) (not shown). As part of the user's online or in-store shopping experience, the mobile device 105 may present a number of products to the user. In this example, the mobile device 105 presents, via display 280, three products to the user: product 1 320, product 2 322, and product 3 324. In some embodiments, the products presented to the user may have been retrieved from a stored location within server computer 125, via network 120. In some embodiments, the user may have come across these products by virtue of accessing an online store from the mobile device 105 via the Internet. The user may select one of the products matching his/her interest to obtain further information about the product. In some embodiments, the user may select a product, via input 330, for purposes of augmenting a real-world setting with the selected product. The mobile device 105 may then present the user with the augmented real-world setting including the selected product within the user's real-world setting (described below).

It can be appreciated that the user may also experience the augmented reality presentation using another type of device. Some examples may include an Xbox Kinect™ device, a PlayStation Eye™ device, or any other device capable of capturing images. The mobile device 105 and these other devices may include a depth sensor or stereo camera to generate a depth image. That is, determining depth measurements for each pixel point within the image captured by the one or more imaging devices 205 (FIG. 2). Using the depth image, a rough geometry of the real-world setting in the captured image may be estimated by fitting planes into a point cloud generated by the depth sensor. The fitted planes may assist in determining supporting planes within the physical environment where objects may be set upon. The depth image also may allow for estimating the absolute scale of the real-world setting, such that the virtual product may be displayed in the appropriate size.

It can be appreciated that the size (e.g., physical dimensions) of the product may be predefined by the store selling the product or by the manufacturer of the product. The products may be defined using multiple sets of dimensions. For example, the coffee maker may be defined with one set of dimensions for when the coffee maker's lid is closed and one set of dimensions for when the coffee maker's lid is open. The seller or manufacturer of the product may also provide additional details about the product (e.g., a door opening feature, a spinning fan feature, etc.)

Figure 4A:
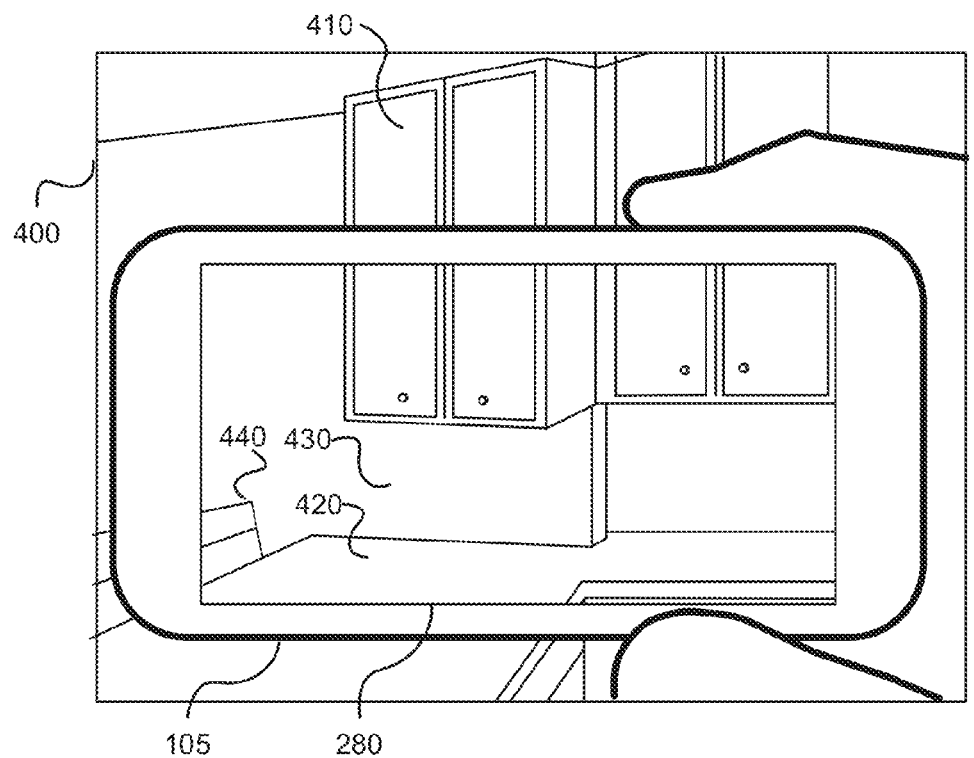
FIG. 4A illustrates capturing one or more images of a real-world setting with a mobile device, according to some embodiments.

FIG. 4A illustrates capturing one or more images of a real-world setting 400 with a mobile device 105, according to some embodiments. A user may point the mobile device 105 at the real-world setting 400 and in the relative area where the user wishes to see product displayed within the real-world setting 400. Mobile device 105 may capture one or more images of the real-world setting 400 via an onboard camera (not shown). In some embodiments, the mobile device 105 may continuously capture a plurality of images of the real-world setting 400 such that the mobile device 105 can display real-time video of the real-world setting 400. The onboard camera may be a depth camera or stereo camera operable to capture a depth image, or alternatively, a RGB camera and a depth sensor may be used in combination to create a depth image. Upon capturing the image, the mobile device 105 may analyze the real-world setting using various components of model generator 215 (FIG. 2), as described above. The analysis may include, but is not limited to: determining the physical dimensions of various objects existing within the physical environment 400, determining the colors of the various objects existing within the physical environment 400, determining categories of the various objects existing within the physical environment 400, and determining a design style of the various objects existing within the real-world setting 400. In some embodiments, the analysis may also include capturing semantics of an object existing within the physical environment 400. For example, performing analysis of a music band poster object may result in a determination that the music band plays rock music. In another example, the analysis may be able to determine a manufacturer name of a particular object. This information may be used to provide product recommendations to the user (described below). In some embodiments, the mobile device 105 may also determine a geographic location at which the image of the real-world setting 400 was captured.

In this particular example, the various objects within the real-world setting 400 include cabinets 410, countertop 420, backsplash 430, and chair 440. These various objects may be recognized and analyzed by the mobile device 105, via various components of the model generator 215 (FIG. 2). In some embodiments, the various objects may be recognized and analyzed by the server computer 125 (FIG. 1) that communicates with the mobile device 105 via network 120 (FIG. 1).

Figure 4B:
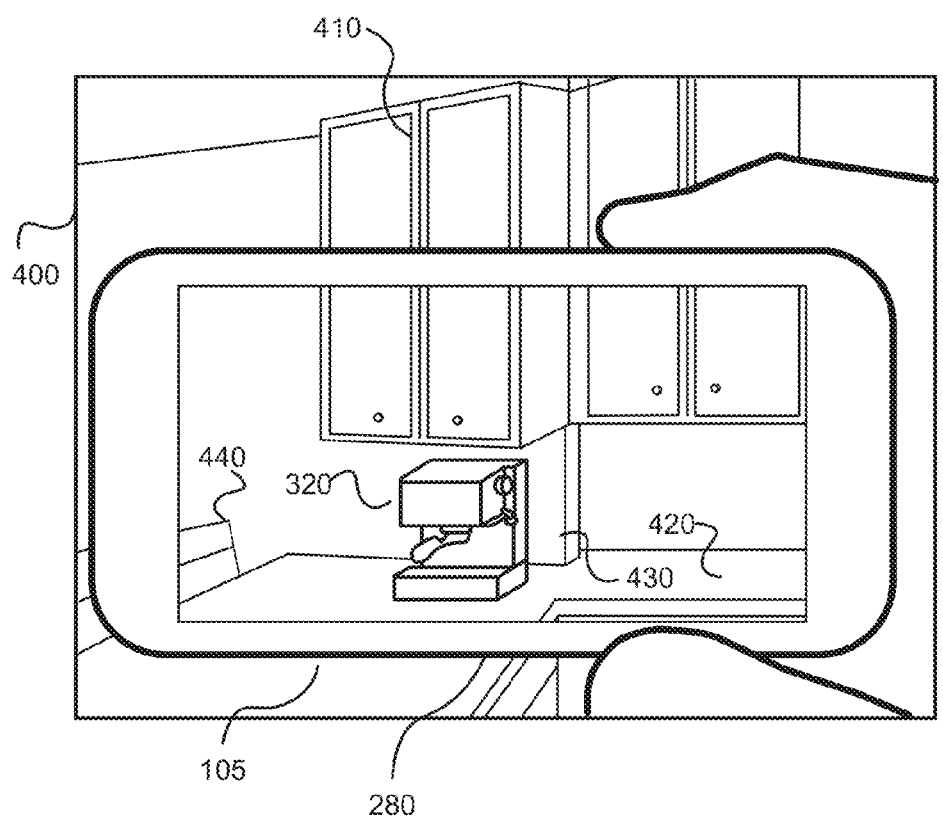
FIG. 4B illustrates placing a product within an augmented real-world setting, according to some embodiments.

FIG. 4B illustrates placing a product 320 within an augmented real-world setting, according to some embodiments. After capturing one or more images of the real-world setting 400 as described above, the user may choose to display a product within the real-world setting 400. In response, the mobile device 105 may overlay an image of the product on an area or surface within the real-world setting 400. In this particular example, the user has placed product A 320 within the real-world setting 400. The user may place product A 120 in any place desired within the real-world setting 400. However, certain locations may be impossible to place the product, e.g., when the product is larger than the bounds of the location the user wishes the place the product. Certain locations may not be optimal to place the product, e.g., a rice cooker is not recommended to be used under a closed top space because cooking steam will rise up. In such case, the mobile device 105 may provide an indication of a placement conflict to the user, described below.

The user is provided, via mobile device 105, with a presentation of an augmented real-world setting including product A 320. The augmented real-world setting may be created via the various components of model interactor 245 (FIG. 2) described above. The augmented real-world setting may depict how product A 320 may look and fit within the real-world setting 400 if the user ultimately purchases the product. Based on determined supporting planes, from the fitted planes used to determine the geometry of the physical environment, objects may be placed in appropriate locations within the real-world setting 400, e.g., on a wall, a counter surface, the floor, etc.

When the user elects to place the product within the real-world setting 400, the mobile device 105 may scale the product dimensions to fit the real-world setting 400 based on the performed analysis, via components of model generator 215 (FIG. 2), of the various other objects within the real-world setting 400. For example, the mobile device 105 may consider the physical dimensions of the chair 440, cabinets 410, backsplash 430, and countertop 420 in order to appropriately scale product A 420 for placement within the physical environment 400.

In some embodiments, the mobile device 105 may continue to capture a plurality of images of the real-world setting 400 while presenting the user with the augmented real-world setting. That is, the user may be able to move the mobile device 105 within the real-world setting 400 and the augmented real-world setting presented to the user may update in real-time. For example, if a user selects a product to be placed within the augmented real-world setting and then moves the mobile device 105 five feet in one direction within the real-world setting 400, the augmented real-world setting may update to show the new perspective of the product and the real-world setting 400 from where the mobile device 105 is now positioned.

Figure 5A:
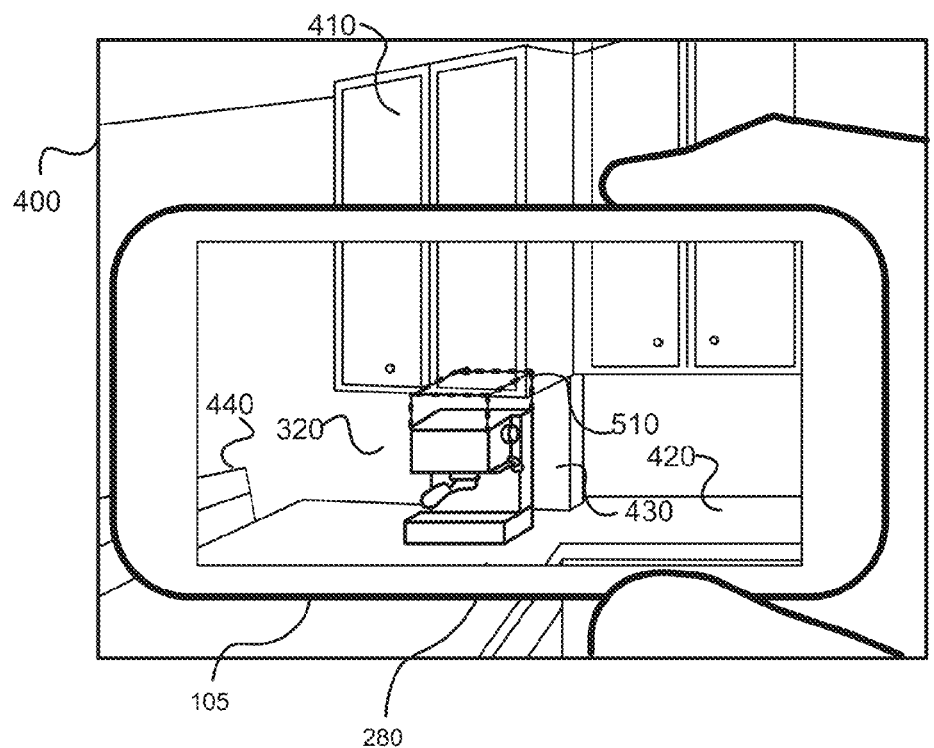
FIG. 5A illustrates displaying additional product dimensions of the product, according to some embodiments.

FIG. 5A illustrates displaying additional product dimensions 510 of the product 320, according to some embodiments. After the user selects the product 320 to augment the real-world setting 400, the mobile device 105 may present additional dimensions 510 required by the product 320 during its use (e.g., a coffee maker having its lid open for pouring in coffee beans). Examples of additional dimensions 510 that a product may require when in use include, but is not limited to: a laundry machine with opening doors, a refrigerator with opening doors, a nightstand with drawers, a bedframe with drawers, a trash can with an opening lid, etc. These parts of the product 320 are typically only temporarily used when interacting with the product 320 and thus any additional dimensions that these parts may take within the real-world setting 400 are typically not defined in the original product dimensions. That is, manufacturers or sellers may typically only provide standard dimensions of the product 320, and not various other dimensions that may be required as a result of interacting with the product 320.

The additional product dimensions 510 of the product 320 may be shown using a graphical indication of the extra dimensions. In this particular example, the additional product dimensions 510 are shown by 3D visualization over the product 320, where the extra space would be required within the real-world setting 400. It can be appreciated that the visual representation of the additional dimensions 510 may be of a shape, size, or color other than that of the product 320. In some embodiments, the additional dimensions 510 may be defined by a content provider (e.g. a manufacturer or a vendor of the product). In some embodiments, the additional dimensions 510 may be determined on-the-fly by the mobile device 105 or the server computer 125 (FIG. 1) in communication with the mobile device 105 via network 120.

As shown in FIG. 5A, the additional dimensions 510 of the product 320 are displayed in an easily identifiable manner. In some embodiments, the graphical indication of the additional dimensions 510 may be presented to the user in a different color than the product 320.

Figure 5B:
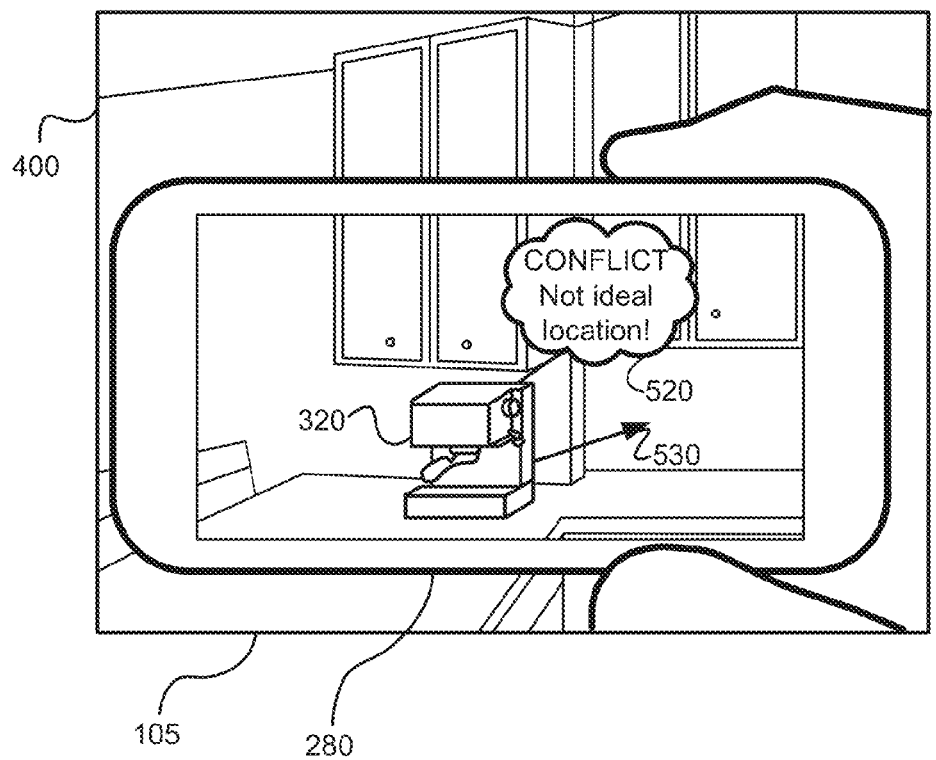
FIG. 5B illustrates identifying a conflict between a position of a product and objects within an image of a real-world setting, according to some embodiments.

FIG. 5B illustrates identifying a conflict between a position of a product 320 and objects within an image of a real-world setting 400, according to some embodiments. As described above, a user may be informed of additional product dimensions 510 (FIG. 5A) that a product may require when being used. At times, unbeknownst to the user, the additional dimensions 510 may create a conflict between the product 320 and other objects identified within the real-world setting 400. A position that the user may have originally thought would accommodate the product 320 may no longer be ideal after being informed of the additional product dimensions 510. For example, a coffee maker under a protruding cabinet may not be an ideal position because a top lid of the coffee opener may not be able to fully open without coming into contact with the cabinet. In other words, the mobile device 105 may notify the user that even though the product 320 may seem to initially fit at a position within the real-world setting 400, the product 320 may not be able to function according to its intended use due to conflicts with additional dimensions 510 or characteristics of the product 320.

As such, the user may be informed if such a conflict exists. A visual indicator 520 may be displayed on the display 280 of the mobile device 105. The visual indicator 520 may indicate to the user that a conflict exists and that the user's selected position for the product 320 may not be ideal. In some embodiments, the visual indicator 520 may display text to the user informing them of the conflict. In some embodiments, the visual indicator 520 may display a specific color to the user informing them of the conflict. It can be appreciated that any other type of visual indication to the user may be used. It can also be appreciated that other types of indicators other than a visual indicator may be used, for example, audio, haptic, tactile, etc.

In some embodiments, the user may also be provided with a recommendation for alternate positioning of the product 320 within the real-world setting 400. The recommendations may be made based on the characteristics of the originally selected product 320, the performed analysis of the various objects within the real-world setting 400, and the performed analysis of the real-world setting 400 itself. The analysis may be performed by components of the model generator 215 and model interactor 245, as described above. The alternate positioning of the product 320 may be recommended to the user by displaying an alternate position arrow 530 indicating a position within the real-world setting 400 that may be more ideal for the product 320. The positioning of the product 320 may be determined based on the analysis of the geometry of the real-world setting 400 and the determination of the supporting planes within the real-world setting 400, as described above. It can be appreciated that an ideal position may include any position that is free of a conflict between the product 320 and the real-world setting 400. In this particular example, the user is recommended to place the coffee maker to the right of the originally selected position and under cabinets that have more clearance between the coffee maker and the bottom of the cabinet. As such, the lid of the coffee maker may be able to open completely without coming into contact with the cabinet.

Figure 6:
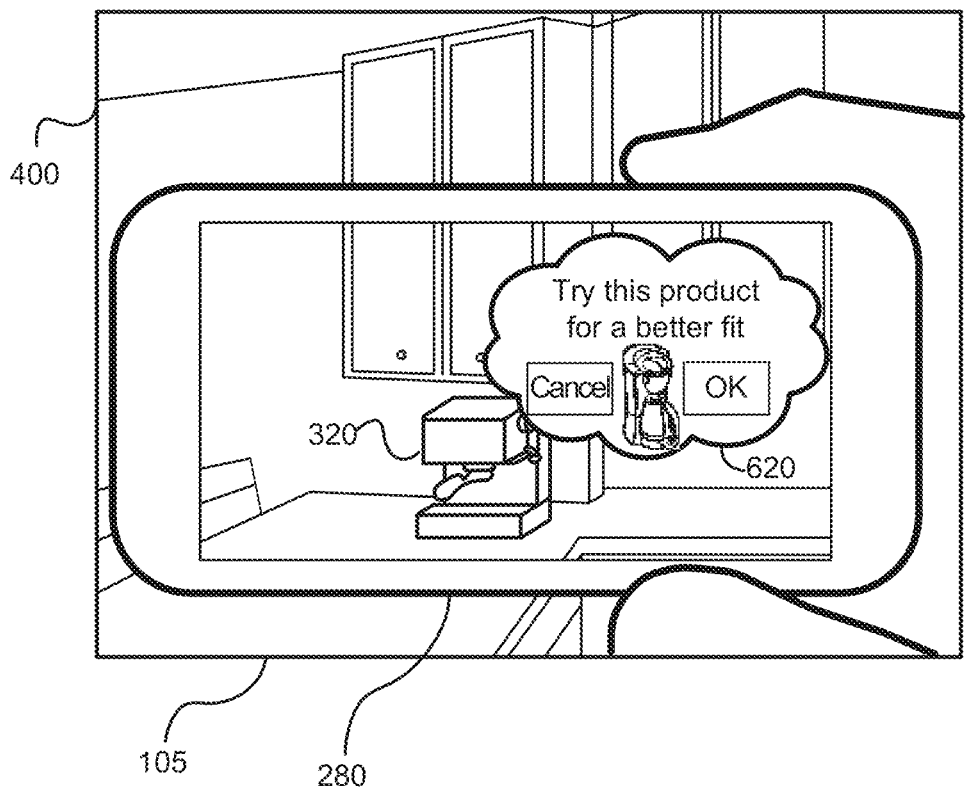
FIG. 6 illustrates an alternate product recommendation in response to identifying a conflict between a position of a product and objects within an image of a real-world setting, according to some embodiments.

FIG. 6 illustrates an alternate product recommendation 620 in response to identifying a conflict between a position of a product 320 and objects within an image of a real-world setting 400, according to some embodiments. In some embodiments, an alternate product may be recommended to the user. This may occur if the originally selected virtual product may not have an ideal position anywhere in the real-world setting 400. For example, a user may be recommended with a smaller coffee maker from a different manufacturer. The product recommendations may be made based on the physical dimensions, colors, categories, and/or design style of the various objects within the real-world setting 400. Additionally, characteristics of the virtual object, such as size and color, may also be accounted for in making the product recommendations. Further, geographic location of the real-world setting 400 may also be taken into account in making product recommendations. The user may be presented with an option to replace the originally selected product 320 with the recommended alternate product. In some embodiments, the alternate product recommendation 620 may be presented to the user as a pop-up notification within the image of the augmented real-world setting. The user may elect, via user input component 210 (FIG. 2), to replace the selected product 320 with the alternate product recommendation or reject the alternate product recommendation. In some embodiments, more than one alternate product recommendation 620 may be presented to the user.

Figure 7:
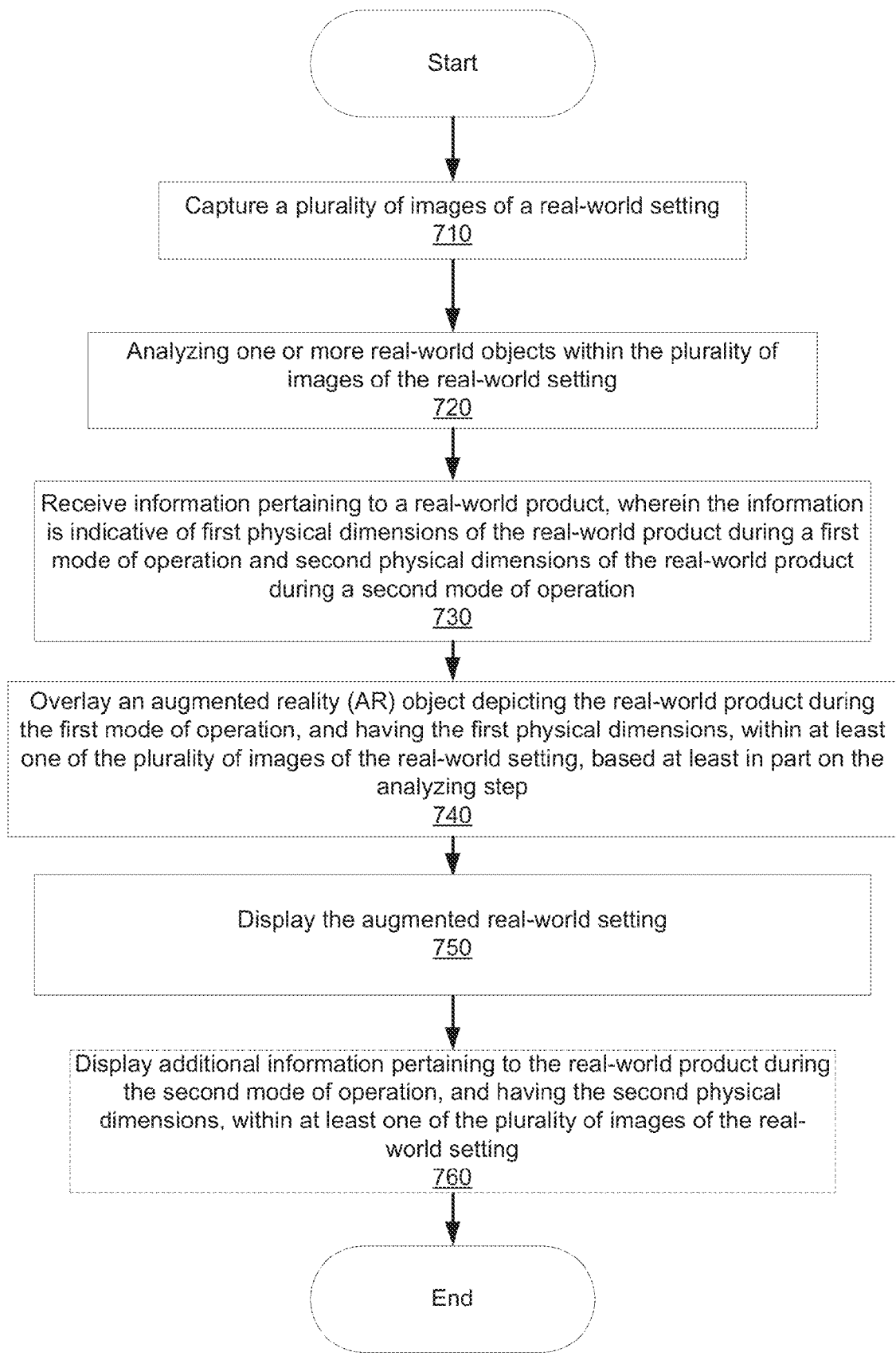
FIG. 7 is a flowchart of an exemplary method for presenting a representation of an augmented real-world setting using a mobile device.

FIG. 7 is a flowchart 700 of an exemplary method for presenting a representation of an augmented real-world setting using a mobile device. In block 710, a plurality of images of a real-world setting is captured. The images may be captured by a camera within a mobile device. The camera may be a depth camera, stereo camera, or a RGB camera with a depth sensor to create a depth image. The captured image may be of a real-world setting. The real-world setting may include various objects. A user may capture one or more images of the real-world setting for purposes of creating, via the mobile device, an augmented real-world setting by overlaying an image of a product within the captured image(s) to obtain an augmented reality presentation of how the product may fit and/or feel within the real-world setting. The captured images may be continuous frames of the real-world setting such that the product image may be overlaid over continuous frames such that the user has a "real time" view of the virtual product in the real-world setting.

In block 720, one or more real-world objects within the plurality of images of the real-world setting are analyzed. The analyzing of the objects may include, but is not limited to: determining physical dimensions of the objects within the image, determining colors of the objects within the image, determining categories of the objects within the image, and determining a design style of the various objects within the image. In some embodiments, the analysis may also include capturing semantics of an object within the physical environment. In some embodiments, the analysis may be able to determine a manufacturer name of a particular object within the image. In some embodiments, a geographic location of the captured image may also be determined Examples of objects within the image may include, but is not limited to: walls, furniture, floors, windows, appliances, decorations, etc. The analyzing may also include determining where to place an AR object within at least one of the images based on the surrounding objects within the scene. The analyzing may be performed by components of a model generator and/or model interactor, as described with respect to FIG. 2.

In block 730, information pertaining to a real-world product is received. The information may be indicative of first physical dimensions of the real-world product during a first mode of operation and second physical dimensions of the real-world product during a second mode of operation. The first physical dimensions may represent standard dimensions, e.g. during a standard mode of operation, of the real-world product while the second physical dimensions may represent alternate dimensions, e.g. during an alternate mode of operation, of the real-world product during various uses of the product. For example, the first dimensions may represent standard dimensions of a coffee maker, e.g., dimensions typically provided by a manufacturer. The second dimensions may represent dimensions of the coffee maker with its lid open. The second dimensions may also be provided by the manufacturer for use with the system described in FIG. 1. In some embodiments, the dimensions may be stored within a server computer and may be received by the mobile device prior to creating the augmented real-world setting. In some embodiments, the dimensions may include at least a height, width, and length of the product.

In block 740, an AR object is overlaid, the AR object depicting the real-world product during the first mode of operation, and having the first physical dimensions, within at least one of the plurality of images of the real-world setting based at least in part on the analyzing step. The overlaying may be performed by components of a model generator and/or model interactor, as described with respect to FIG. 2. The image of the AR object depicting the real-world product may be overlaid within at least one of the plurality of images of the real-world setting at a position determined and selected by the user. For example, if the user selects to place the real-world product in a corner of a room in the real-world setting, the mobile device may create an augmented real-world setting of the room including the AR object depicting the real-world product in the corner of the room. The AR object depicting the real-world product may be continuously overlaid over an area or surface of the real-world setting so that a "real time" view of the AR object depicting the real-world product within the augmented real-world setting may be viewed by the user. The AR object depicting the real-world product may be scaled based on physical dimensions of the other objects within the image. The AR object depicting the real-world product may be overlaid at a position within the image defined by the user. The real-world product may have product dimensions that are predefined by a content provider (e.g., a manufacturer or vendor of the real-world product).

In some embodiments, additional product dimensions of the real-world product are displayed. The additional product dimensions may be dimensions defining the real-world product when in use. For example, the extra height needed by a coffee maker when its top lid is open. The additional product dimensions may be predefined by a content provider (e.g., a manufacturer or vendor of the product) or may be determined by a computing device or the server computer in communication with the computing device. In some embodiments, additional product dimensions may be displayed using a 3D shape outlining the height, length, and width of the additional production dimensions.

In some embodiments, the AR object depicting the real-world product presented within the augmented real-world setting may be replaced or modified with a second AR object depicting the real-world product having the second dimensions. That is, the real-world product may be shown with the additional dimensions, if the user indicates that he/she wishes to see the product with those dimensions within the augmented real-world setting. In block 750, the augmented real-world setting is presented. The augmented real-world setting may be presented to the user via a display device of the mobile device.

In block 760, additional information pertaining to the real-world product during the second mode of operation, and having the second physical dimensions, is displayed within at least one of the plurality of images of the real-world setting. In some embodiments, displaying the additional information includes updating the augmented real-world setting to depict the AR object having the second physical dimensions. In some embodiments, the additional information includes a notification that the second physical dimensions conflict with the one or more real-world objects within the augmented real-world setting.

In some embodiments, the augmented real-world setting is updated based at least in part on a perspective of the real-world setting from the mobile device. The updating may be performed by components of a model generator and/or model interactor, as described with respect to FIG. 2. That is, the user may be able to move the mobile device within the real-world setting and the augmented real-world setting presented to the user may update in real-time. For example, if a user selects a product to be placed within the augmented real-world setting and then moves the mobile device five feet in one direction within the real-world setting, the augmented real-world setting may update to show the new perspective of the product and the real-world setting from where the mobile device is now positioned. It can be appreciated that updating the augmented real-world setting is optional.

In some embodiments, the method may include identifying a conflict between a position of the product and objects within the images of the real-world setting. At times, the additional dimensions may create a conflict between the position of the object and other objects within the real-world setting. A position that the user may have originally thought would accommodate the product may no longer be ideal after being informed of the additional dimensions. For example, a coffee maker under a protruding cabinet may not be an ideal position because a top lid of the coffee opener may not be able to fully open without coming into contact with the cabinet.

In some embodiments, a user may be informed if such a conflict exists via a visual indicator. The visual indicator may indicate that a conflict exists and that selected position for the product may not be ideal. It can be appreciated that any other type of visual indication to the user may be used.

In some embodiments, recommendations for an alternate position within the augmented real-world setting for placing the product may be made. The recommendations may be made based on the characteristics of the originally selected product and the performed analysis of the various objects within the real-world setting.

In some embodiments, recommendations for an alternate product may be made. This may occur if the originally selected virtual product may not have an ideal position anywhere in the image. An option may be presented to replace the originally selected virtual product with the recommended alternate product.

Figure 8:
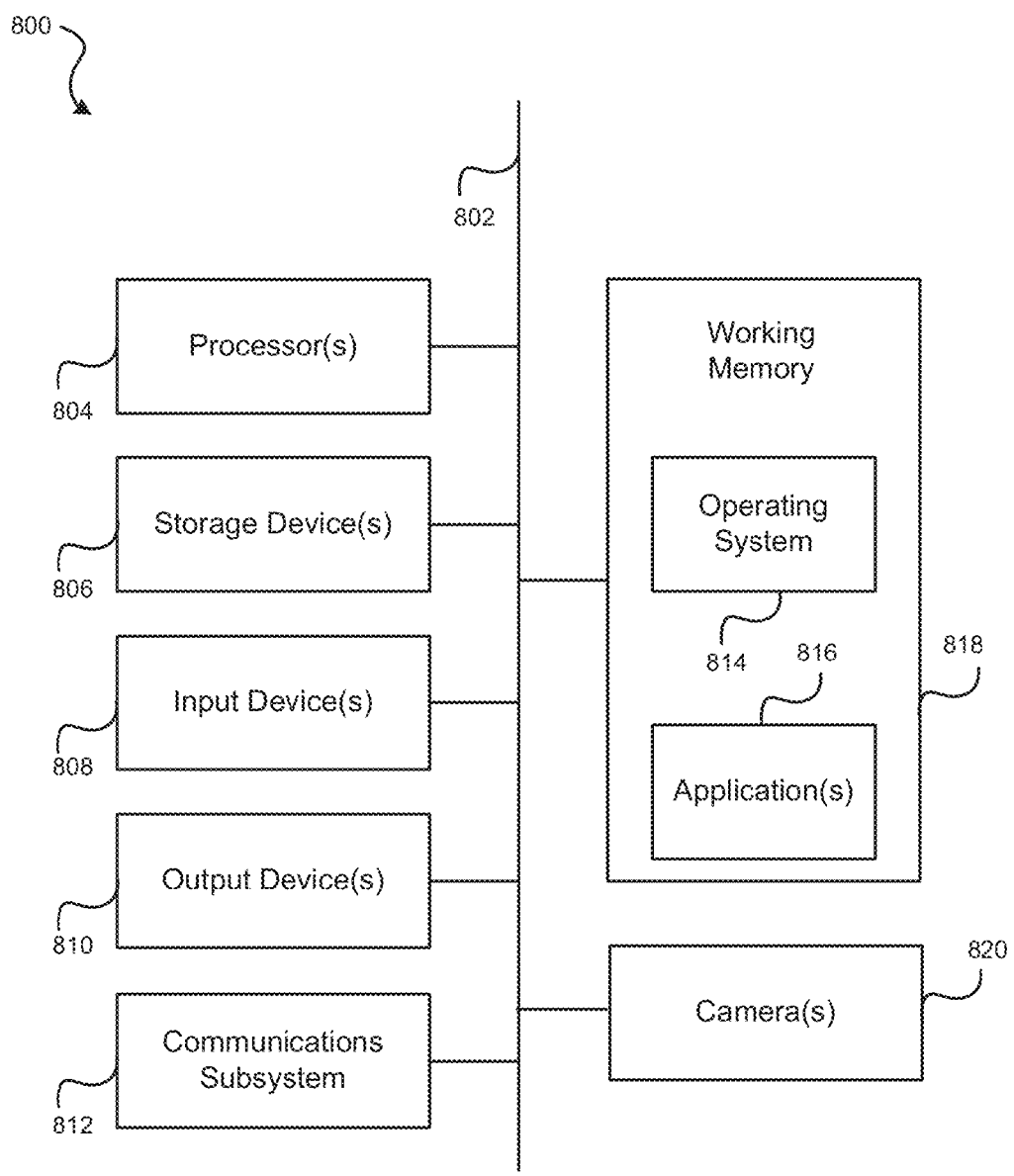
FIG. 8 illustrates an example of a computing system in which one or more embodiments may be implemented.

FIG. 8 illustrates an example of a computing system 800 in which one or more embodiments may be implemented.

A computer system as illustrated in FIG. 8 may be incorporated as part of the above described computerized device. For example, computer system 800 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones, head mounted display, and any other hand-held devices. FIG. 8 provides a schematic illustration of one embodiment of a computer system 800 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 8 is meant only to provide a generalized illustration of various components, any or all of which may be utilized as appropriate. FIG. 8, therefore, broadly illustrates how individual system elements may be implemented in a relatively separated or relatively more integrated manner. In some embodiments, components of computer system 800 may be used to implement mobile device 105.

The computer system 800 is shown comprising hardware elements that can be electrically coupled via a bus 802 (or may otherwise be in communication, as appropriate). The hardware elements may include one or more processors 804, including without limitation one or more general-purpose processors and/or one or more special-purpose processors (such as digital signal processing chips, graphics acceleration processors, and/or the like); one or more input devices 808, which can include without limitation one or more cameras, sensors, a mouse, a keyboard, a microphone configured to detect ultrasound or other sounds, and/or the like; and one or more output devices 810, which can include without limitation a display unit such as the device used in embodiments of the invention, a printer and/or the like. Additional cameras 820 may be employed for detection of user's extremities and gestures. In some implementations, input devices 808 may include one or more sensors such as infrared, depth, and/or ultrasound sensors.

In some implementations of the embodiments of the invention, various input devices 808 and output devices 810 may be embedded into interfaces such as display devices, tables, floors, walls, and window screens. Furthermore, input devices 808 and output devices 810 coupled to the processors may form multi-dimensional tracking systems.

The computer system 800 may further include (and/or be in communication with) one or more non-transitory storage devices 806, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 800 might also include a communications subsystem 812, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 812 may permit data to be exchanged with a network, other computer systems, and/or any other devices described herein. In many embodiments, the computer system 800 will further comprise a non-transitory working memory 818, which can include a RAM or ROM device, as described above.

The computer system 800 also can comprise software elements, shown as being currently located within the working memory 818, including an operating system 814, device drivers, executable libraries, and/or other code, such as one or more application programs 816, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 806 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 800 may be omitted or may be implemented separate from the illustrated system. For example, the processor 804 and/or other elements may be implemented separate from the input device 808. In one embodiment, the processor is configured to receive images from one or more cameras that are separately implemented. In some embodiments, elements in addition to those illustrated in FIG. 8 may be included in the computer system 800.

Some embodiments may employ a computer system (such as the computer system 800) to perform methods in accordance with the disclosure. For example, some or all of the procedures of the described methods may be performed by the computer system 800 in response to processor 804 executing one or more sequences of one or more instructions (which might be incorporated into the operating system 814 and/or other code, such as an application program 816) contained in the working memory 818. Such instructions may be read into the working memory 818 from another computer-readable medium, such as one or more of the storage device(s) 806. Merely by way of example, execution of the sequences of instructions contained in the working memory 818 might cause the processor(s) 804 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 800, various computer-readable media might be involved in providing instructions/code to processor(s) 804 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 806. Volatile media include, without limitation, dynamic memory, such as the working memory 818. Transmission media include, without limitation, coaxial cables, copper wire and fiber optics, including the wires that comprise the bus 802, as well as the various components of the communications subsystem 812 (and/or the media by which the communications subsystem 812 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 804 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 812 (and/or components thereof) generally will receive the signals, and the bus 802 then might carry the signals (and/or the data, instructions, etc. carried by the signals) to the working memory 818, from which the processor(s) 804 retrieves and executes the instructions. The instructions received by the working memory 818 may optionally be stored on a non-transitory storage device 506 either before or after execution by the processor(s) 804.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 504—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for presenting a representation of an augmented real-world setting using a mobile device, the method comprising:
   capturing a plurality of images of a real-world setting;
   analyzing, via the mobile device, one or more real-world objects within the plurality of images of the real-world setting;
   receiving information pertaining to a real-world product, wherein the information is indicative of first physical dimensions of the real-world product during a first mode of operation and second physical dimensions of the real-world product during a second mode of operation;
   overlaying an augmented reality (AR) object depicting the real-world product during the first mode of operation, and having the first physical dimensions, within at least one of the plurality of images of the real-world setting, based at least in part on the analyzing step; and
   displaying additional information pertaining to the real-world product during the second mode of operation, and having the second physical dimensions, within at least one of the plurality of images of the real-world setting.

2. The method of claim 1 wherein displaying the additional information further comprises updating the AR object to depict the real world product during the second mode of operation and having the second physical dimensions.

3. The method of claim 1 wherein the additional information comprises a notification that the second physical dimensions conflict with the one or more real-world objects within the real-world setting.

4. The method of claim 1 further comprising, updating, via the mobile device, the augmented real-world setting based at least in part on a perspective of the real-world setting from the mobile device.

5. The method of claim 1 wherein the analyzing step comprises determining physical dimensions of the one or more real-world objects within at least one image of the real-world setting.

6. The method of claim 1 further comprising determining whether the overlaid AR object depicting the real-world product conflicts with the one or more real-world objects within the augmented real-world setting, based at least in part on at least one of the first physical dimensions of the product model or the second physical dimensions of the real-world product.

7. The method of claim 6 further comprising recommending, via the mobile device, a second position for overlaying the AR object depicting the real-world product within at least one of the plurality of images of the real-world setting, in response to determining the conflict.

8. The method of claim 6 further comprising recommending, via the mobile device, one or more alternate real-world products, in response to determining the conflict.

9. The method of claim 8 further comprising updating the augmented real-world setting by replacing the AR object with a second AR object depicting at least one of the one or more alternate real-world products within at least one of the plurality of images of the real-world setting.

10. The method of claim 1 further comprising receiving the information pertaining to the real-world product from a server computer.

11. The method of claim 1 wherein the first physical dimensions and the second physical dimensions comprise at least one of a height, length, and width.

12. An apparatus for presenting a representation of an augmented real-world setting, the apparatus comprising:
- an image capture device configured to capture a plurality of images of a real-world setting;
- a display device configured to display the augmented real-world setting;
- a processor coupled to the image capture device and the display device, wherein the processor is configured to:
- analyze one or more real-world objects within the plurality of images of the real-world setting;
- receive information pertaining to a real-world product, wherein the information is indicative of first physical dimensions of the real-world product during a first mode of operation and second physical dimensions of the real-world product during a second mode of operation;
- overlay an AR object depicting the real-world product during the first mode of operation, and having the first physical dimensions, within at least one of the plurality of images of the real-world setting based at least in part on the analyzing step; and
- display, via the display device, additional information pertaining to the real-world product during the second mode of operation, and having the second physical dimensions, within at least one of the plurality of images of the real-world setting.

13. The apparatus of claim 12 wherein displaying the additional information further comprises updating the AR object to depict the real world product during the second mode of operation and having the second physical dimensions.

14. The apparatus of claim 12 wherein the additional information comprises a notification that the second physical dimensions conflict with the one or more real-world objects within the real-world setting.

15. The apparatus of claim 12 wherein the processor is further configured to update the augmented real-world setting based at least in part on a perspective of the real-world setting from the image capture device.

16. The apparatus of claim 12 wherein the analyzing step comprises determining physical dimensions of the one or more real-world objects within at least one image of the real-world setting.

17. The apparatus of claim 12 wherein the processor is further configured to determine whether the overlaid AR object depicting the real-world product conflicts with the one or more real-world objects within the augmented real-world setting, based at least in part on at least one of the first physical dimensions of the product model or the second physical dimensions of the real-world product.

18. The apparatus of claim 17 wherein the processor is further configured to recommend a second position for overlaying the AR object depicting the real-world product within at least one of the plurality of images of the real-world setting, in response to determining the conflict.

19. The apparatus of claim 17 wherein the processor is further configured to recommend one or more alternate real-world products, in response to determining the conflict.

20. The apparatus of claim 19 wherein the processor is further configured to update the augmented real-world setting by replacing the AR object with a second AR object depicting at least one of the one or more alternate real-world products within at least one of the plurality of images of the real-world setting.

21. The apparatus of claim 12 wherein the processor is further configured to receive the information pertaining to the real-world product from a server computer.

22. The apparatus of claim 12 wherein the first physical dimensions and the second physical dimensions comprise at least one of a height, length, and width.

23. An apparatus for presenting a representation of an augmented real-world setting, the apparatus comprising:
- means for capturing a plurality of images of a real-world setting;
- means for analyzing one or more real-world objects within the plurality of images of the real-world setting;
- means for receiving information pertaining to a real-world product, wherein the information is indicative of first physical dimensions of the real-world product during a first mode of operation and second physical dimensions of the real-world product during a second mode of operation;
- means for overlaying an augmented reality (AR) object depicting the real-world product during the first mode of operation, and having the first physical dimensions, within at least one of the plurality of images of the real-world setting, based at least in part on the analyzing step; and
- means for displaying additional information pertaining to the real-world product during the second mode of operation, and having the second physical dimensions, within at least one of the plurality of images of the real-world setting.

24. The apparatus of claim 23 wherein displaying the additional information further comprises updating the AR object to depict the real world product during the second mode of operation and having the second physical dimensions.

25. The apparatus of claim 23 wherein the additional information comprises a notification that the second physical dimensions conflict with the one or more real-world objects within the real-world setting.

26. The apparatus of claim 23 further comprising:
- means for updating the augmented real-world setting based at least in part on a perspective of the real-world setting from the mobile device; and
- means for determining whether the overlaid AR object depicting the real-world product conflicts with the one or more real-world objects within the augmented real-world setting, based at least in part on at least one of the first physical dimensions of the product model or the second physical dimensions of the real-world product.

27. A processor-readable, non-transitory, computer readable medium comprising processor readable instructions configured to cause a processor, on a mobile device, to:
- capture a plurality of images of a real-world setting;
- analyze one or more real-world objects within the plurality of images of the real-world setting;
- receive information pertaining to a real-world product, wherein the information is indicative of first physical dimensions of the real-world product during a first mode of operation and second physical dimensions of the real-world product during a second mode of operation;
- overlay an augmented reality (AR) object depicting the real-world product during the first mode of operation, and having the first physical dimensions, within at least one of the plurality of images of the real-world setting, based at least in part on the analyzing step; and
- display additional information pertaining to the real-world product during the second mode of operation, and having the second physical dimensions, within at least one of the plurality of images of the real-world setting.

28. The processor-readable, non-transitory, computer readable medium of claim 27 wherein displaying the additional information further comprises updating the AR object to depict the real world product during the second mode of operation and having the second physical dimensions.

29. The processor-readable, non-transitory, computer readable medium of claim 27 wherein the additional information comprises a notification that the second physical dimensions conflict with the one or more real-world objects within the real-world setting.

30. The processor-readable, non-transitory, computer readable medium of claim 27 wherein the instructions are further configured to cause the processor to:
   update, via the mobile device, the augmented real-world setting based at least in part on a perspective of the real-world setting from the mobile device; and
   determine whether the overlaid AR object depicting the real-world product conflicts with the one or more real-world objects within the augmented real-world setting, based at least in part on at least one of the first physical dimensions of the product model or the second physical dimensions of the real-world product.

\* \* \* \* \*